United States Patent [19]

Edgar

[11] Patent Number: 5,598,186
[45] Date of Patent: Jan. 28, 1997

[54] SYSTEM AND METHOD FOR IMAGE MAPPING IN LINEAR SPACE

[75] Inventor: Albert D. Edgar, Austin, Tex.

[73] Assignee: International Business Machines Corporation, Armonk, N.Y.

[21] Appl. No.: 402,770

[22] Filed: Mar. 13, 1995

Related U.S. Application Data

[63] Continuation of Ser. No. 921,793, Jul. 30, 1992, abandoned.

[51] Int. Cl.[6] .................................................... G09G 5/06
[52] U.S. Cl. .......................................... 345/154; 345/199
[58] Field of Search .................................... 345/150, 153, 345/154, 186, 199; 348/674; 358/518, 519, 456, 447, 515, 517

[56] References Cited

U.S. PATENT DOCUMENTS

| | | | |
|---|---|---|---|
| 4,257,071 | 3/1981 | Lamb | 358/286 |
| 4,513,278 | 4/1985 | Seitz et al. | 340/347 |
| 4,645,459 | 2/1987 | Graf et al. | 434/43 |
| 4,667,190 | 5/1987 | Fant | 340/747 |
| 4,777,651 | 10/1988 | McCann et al. | 382/21 |
| 4,825,388 | 4/1989 | Dailey et al. | 364/518 |
| 4,835,532 | 5/1989 | Fant | 340/728 |
| 4,843,405 | 6/1989 | Morikawa et al. | 346/1.1 |
| 4,874,936 | 10/1989 | Chandler et al. | 235/494 |
| 4,879,595 | 11/1989 | Niki et al. | 358/80 |
| 4,896,029 | 1/1990 | Chandler et al. | 235/494 |
| 4,899,293 | 2/1990 | Dawson et al. | 364/521 |
| 4,899,394 | 2/1990 | Lee | 382/9 |
| 4,918,633 | 4/1990 | Sullivan | 364/574 |
| 4,937,662 | 6/1990 | Matsunawa et al. | 358/75 |
| 4,941,193 | 7/1990 | Barnsley et al. | 382/56 |
| 4,962,433 | 10/1990 | Matsushima | 348/674 |
| 4,998,010 | 3/1991 | Chandler et al. | 235/494 |
| 5,016,096 | 5/1991 | Matsunawa et al. | 358/75 |
| 5,038,390 | 8/1991 | Ravi Chandran | 382/56 |
| 5,040,059 | 8/1991 | Leberl | 358/107 |
| 5,046,027 | 9/1991 | Taaffe et al. | 364/521 |
| 5,047,842 | 9/1991 | Bouman, Jr. et al. | 358/75 |
| 5,054,100 | 10/1991 | Tai | 382/47 |
| 5,070,413 | 12/1991 | Sullivan et al. | 358/456 |
| 5,162,925 | 11/1992 | Takaoka et al. | 358/447 |
| 5,196,924 | 3/1993 | Lumelsky | 348/674 |

OTHER PUBLICATIONS

Orchard, M. T, Boumar, C. A. "Color Quantization of Images" IEEE Trans on Signal Processing. 39(12):2677–2690 Dec. '91.

IBM Technical Disclosure Bulletin, vol. 35, No. 1A, pp. 60–61, entitled "Separated Luminance And Chrominance Diffusion".

IBM Technical Disclosure Bulletin, vol. 35, No. 1A, pp. 52–53, entitled "Pel Color Encoding With Room For Overflow".

Primary Examiner—Ulysses Weldon
Assistant Examiner—Lun-Yi Lao
Attorney, Agent, or Firm—Robert M. Carwell

[57] ABSTRACT

Red, green and blue pixels of a digitized image are combined to form a single vector that points to three lookup tables translating each pixel to linear Y, I, Q values thereby forming a linear image. The color value of each pixel in the linear image, comprised of Y, I, Q "aim" values, is then sequentially processed to attempt a match to the closest available colors. These three aim values point to respective lookup tables which translate them to three corresponding intermediate numbers which, when summed, point to a larger table mapping them to a number corresponding to the closest color in the predetermined palette. Three lookup tables translate the map number back to the linear space with corresponding mapped Y, I, Q values. The difference between these values and prior aim values constitutes error arising from the finite palette. The error is corrected with opposite error of adjoining pixels by error diffusion techniques.

4 Claims, 6 Drawing Sheets

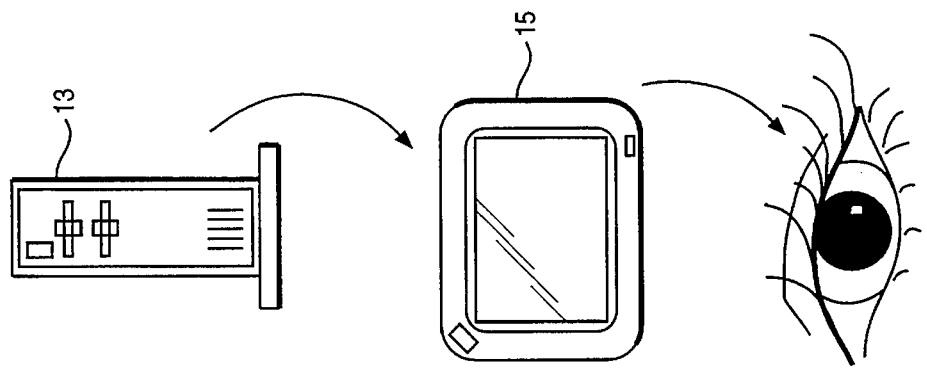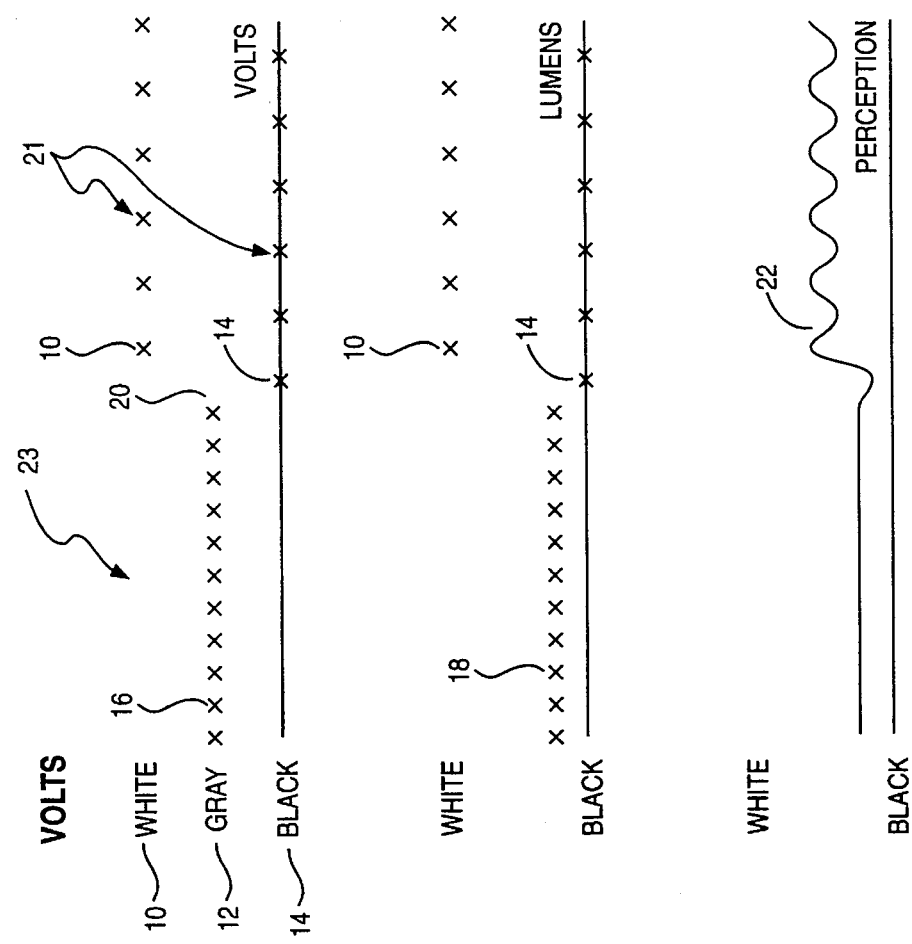
FIG. 1 PRIOR ART

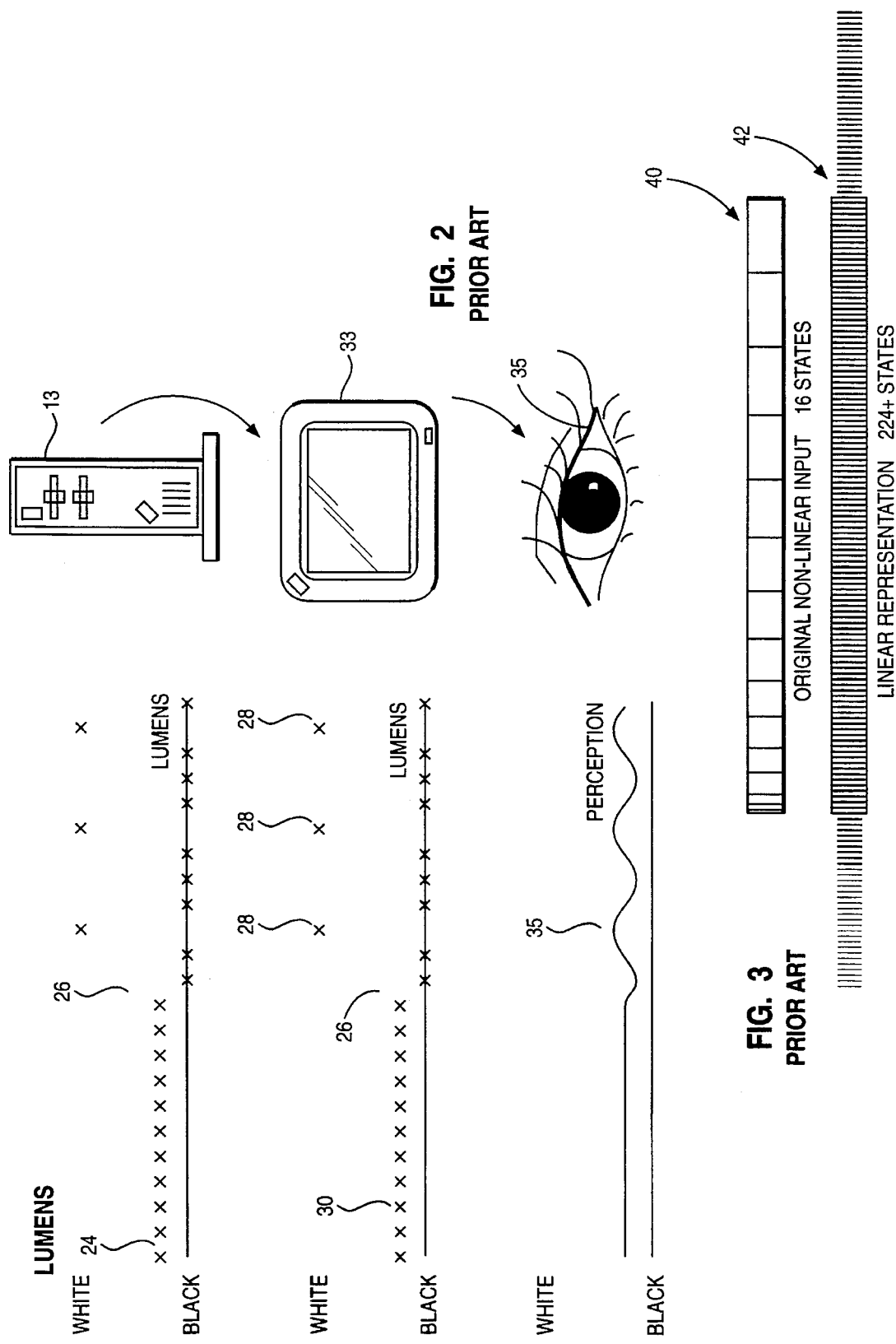

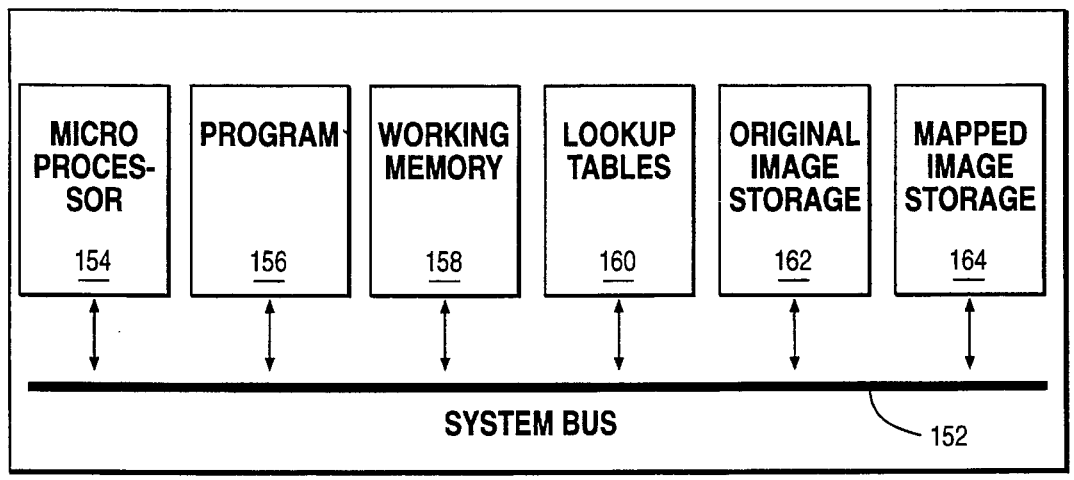
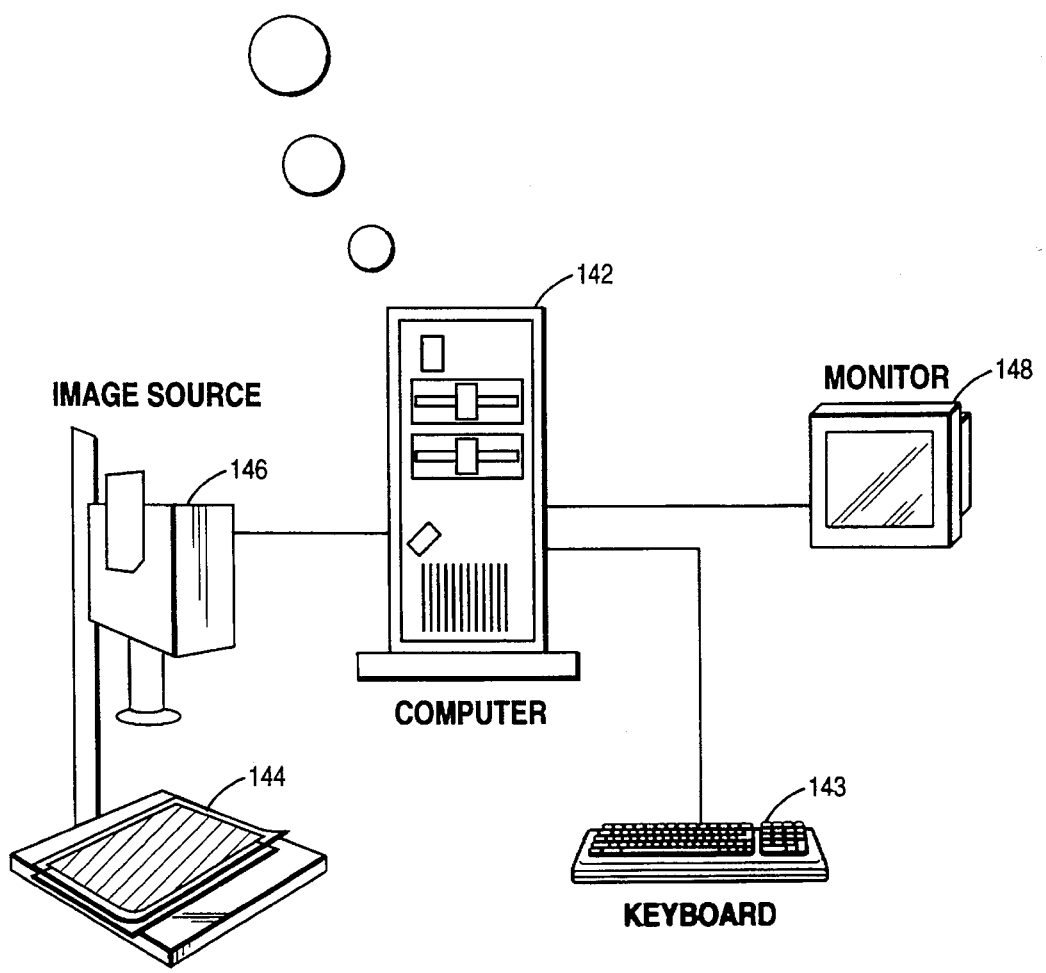
FIG. 7

SYSTEM AND METHOD FOR IMAGE MAPPING IN LINEAR SPACE

This is a continuation of application Ser. No. 07/921,793 filed Jul. 30, 1992 is now abandoned.

TECHNICAL FIELD

The present invention relates generally to image processing and, more particularly, is directed to systems and methods for eliminating artifacts associated with image display nonlinearities.

BACKGROUND ART

Image display nonlinearities cause color shifts and mottle in images mapped to a palette with, conventional mapping algorithms well known in the art. As will hereinafter become clear, a system and method was highly sought for eliminating such artifacts. Accordingly, a technique has been provided by the invention for achieving this object wherein mapping occurs in a space where numbers are linearly related to display lumens. Such linear mapping is made practical in accordance with the invention by a two-step lookup method of finding closest palette colors and by an optimization system and method for deriving such lookup tables.

Referring first to FIG. 1, a prior art nonlinear mapping technique is shown therein. For simplicity, only a single scan line is illustrated. The top illustration depicts a typical output voltage of a digital-to-analog converter (DAC) in a computerized imaging system 13. The middle illustration indicates the lumen values emitted by a typical CRT display driven by system 13 relative to the DAC voltage. The bottom figure illustrates human perception of intensity of the same video information represented in the proceeding two illustrations caused by lumen averaging in the human eye optics. In such systems, simplified for purposes of illustration, there is only provision for white 10, black 14 and 50% gray 12 values in the system's palette (as shown by the ordinate). In the illustrated example, the system is attempting to reproduce an original input which is a constant 50% gray. Accordingly, the system would select a gray value 16 for each pel of the image. Inasmuch as the numbers, corresponding to image pel values utilized by a typical computer in a digital video image processing system, are operated upon by DAC converters, these values may be thought of as representing voltages directly, which explains the labeling of the ordinate as VOLTS. However, when the 50% voltage, corresponding to the gray 12 values 16, are in turn operated upon by a normal nonlinear video monitor, these gray values correspond to 25% lumens. However, physiology of the eye is such that it perceives 25% lumens as being midway between 100% white and 0% black, which is precisely what a camera capturing the original image intended. Television and computer monitors are designed to produce an illumination proportional to the square of the driving voltage. This squaring is another way to state the monitor gamma is 2.0. Halfway through the image conversion, shown at reference numeral 20 in FIG. 1, for illustrative purposes we may assume that in conversion of the image to digital form the 50% gray value 12 from the palette is no longer available. Accordingly, to reproduce gray, the system would therefore have to oscillate between the black and white values to result in the perception of 50% gray. In order to do so the average voltage out of the DAC converters being acted upon by a video monitor would be the same as in the case of utilizing the gray pixel values 16, although in this case alternately pixel values for white 10 and black 14 would have to be selected inasmuch as the gray value is no longer available. This oscillation is shown at reference numeral 21 in FIG. 1.

Although the average voltage value being operated upon by an appropriate video monitor might nevertheless be the same, something quite different happens from the situation first depicted with reference to the portion 23 of FIG. 1. The video amplifier of the display monitor would typically oscillate as each white or black pixel is displayed between 100% white and 0% black lumens However due to numerous physical phenomenon such as electrons blurring linearly on their way to the phosphor of the display or photons blurring on their way to the retina, etc., the human eye would nevertheless finally perceive 50% lumens as shown at reference numeral 22 (e.g., a value twice the intended 25% lumens shown at reference numeral 18).

Referring now to FIG. 2, again for illustrative purposes, one might imagine a revised mapping program working with numbers representing not voltage but rather lumens in accordance with the invention, which more desirably would provide for image mapping in linear space. The original input signal must be converted from volts to lumens, and the palette colors in like manner would be translated to lumens. In such a case, the original input 16 shown in FIG. 1 would thereby be represented in the computer system 13 as a constant 25% lumens shown at reference numeral 24 of FIG. 2, and the colors in the palette would be black, white and 25% lumens gray.

In terms of the display 33, at first, the gray values 30 would be selected as perfect matches for each pel. At a midway point 26, for illustrative purposes similar to the midway point 20 of FIG. 1, midway through the conversion one might again assume that the gray level was removed from the palette and if so, again something quite different occurs. The video processing system 13 would aim at 25% lumens and not 50% to as before, therefore choosing only half as many white pels 28 as it did previously in the case of the example of FIG. 1. Accordingly, the eye would thus perceive the desired 25% lumens as shown at reference numeral 35 and not the jump to the 50% lumens as in the prior example relative to FIG. 1. In other words from the foregoing, it will be apparent that the loss of the gray pel values would not make the image appear twice as bright as it should, be.

Although the foregoing examples are rather simplistic and extreme, the effect discovered may often in like manner be equally as pronounced. In actual use, however, more commonly the perceived effect is more subtle but, nevertheless, does lighten and add mottle in excess of diffusion noise in proportion to the square of the magnitude of the diffused error. In most conventional palettes there are fewer colors along the blue axis, and therefore more diffused error along the blue axis, thereby explaining the bluishness often seen in some mapped images. Particularly in high noise diffusion systems such as those hereinafter discussed referring to separated luminance and chrominance diffusion and positive feedback error diffusion, image mapping calculated in linear lumen space as portrayed in FIG. 2 is necessary to prevent very noticeable color shifts and mottle.

The assumption has been made in the foregoing that the highest frequencies, in fact, get transmitted through the video amplifier of the display to the electron gun. If the signal at this point is peaked to overcome blurring by the display tube, then the effect hereinbefore noted may be magnified, whereas if the video amplifier is sluggish the effect is less pronounced. The nonlinearity occurs in the electron gun of the cathode ray tube (CRT). Blurring caused by spread of the electron beam, phosphor light piping and blurring by the eye lens are all linear, and thus overall system resolution is not a measure of the effect.

In provision for an algorithm to perform mapping in the manner described with reference to FIGS. 1 and 2, as hereinbefore noted such mapping might be similar after input and palette conversion. However, as depicted in FIG. 3, a quantization or granularity problem is associated with linear mapping. As shown at reference numeral 40, an original signal would have states spaced nonlinearly when plotted on a linear lumens scale, such as the 16 states shown depicted therein graphically. Although these states are nonlinear, they nevertheless represent equal steps of perception, and thus all states are equally important.

In contrast, if a linear lumen scale is selected, 42, capable of resolving original nonlinear input as, for example, in shadows, then the linear representation must have 224 states shown at reference numeral 41 to match just 16 states of input shown at reference numeral 40. However, there are even further difficulties with such linear representations. When an input has more than 16 states, which as a practical matter would be anticipated, one would require even more resolution to avoid roundoff, and signals must further be represented far beyond saturation, particularly with high performance mapping algorithms which can drift far into saturation on the color axis. The three linear color coordinates must each be 16-bit words, and even that can be marginal. With the advent of modern computing power, 16-bit arithmetic poses no real problem in image processing. However, in order to find the closest palette color to a specific aim color, even with 16-bit arithmetic, this objective can in fact pose extreme problems addressed by the subject invention. A direct search algorithm, for example, may require many hours in order to map an image. In some prior art methods, such as represented in the Audio Visual Connection product of the IBM Corporation, a table lookup method is employed to locate the closest palette color. However concatenating three 16-bit integers yields a pointer into a table which is impractically large.

For purposes of background, the subject invention employs a two-stage lookup as illustrated in FIG. 4. First, each of three 16-bit color vectors 42–46 are employed to point to its own lookup table to select one of approximately 50 very strategically placed states. The results of these three lookups may be combined to form a single pointer into a large three-dimensional lookup table that holds the closest palette colors in the manner of the invention to be hereinafter described in greater detail. Lookup tables have been well known and employed in the video image processing field for several years. However, as just described, a method was needed in the art for image mapping in linear space to reduce or eliminate artifacts caused by image display nonlinearities employing linear mapping wherein a practical lookup method of finding closest palette colors could be provided and wherein placement of states is optimized in order to achieve such practicality.

SUMMARY OF THE INVENTION

From the foregoing, it will be understood that an image mapping system and method was needed which could eliminate artifacts arising from image display nonlinearities. Such a system was further required which could employ linear mapping which was nevertheless practical in terms of storage and processor speed requirements, and which was further optimized for determining palette colors.

Red, green and blue values from each pixel of a digitized image are combined to point to three lookup tables translating each pixel to linear Y, I, Q values thereby forming a linear image. The color value of each pixel in the linear image, comprised of Y, I, Q "aim" values, is then sequentially processed to attempt a match to the closest available colors in the palette. To match this closest color, these three aim values point to respective lookup tables which translate them to three corresponding intermediate numbers which, when summed, point to a larger table mapping them to a number corresponding to the closest color in the predetermined palette.

Three lookup tables translate the palette map number back to the linear space with corresponding mapped Y, I, Q values. The difference between these values and prior aim values constitutes error arising from the finite palette. The error is corrected with opposite error of adjoining pixels by error diffusion techniques.

In one embodiment, the error alters the linear Y, I, Q values of yet unmapped pixels prior to their being converted to aim values. The linear image is precalculated so that error-correcting addition or subtraction is made prior to the pixel's conversion or, to save memory space, the value to add or subtract is stored in an array so that it may be added when the pixel is converted.

BRIEF DESCRIPTION OF THE DRAWING

These and other benefits and objectives are provided by the present invention, a more detailed understanding of which may be attained with reference to the following figures wherein:

FIG. 1 is an illustration of a very simple prior art system employing standard nonlinear lumen image mapping error diffusion;

FIG. 2 is an illustration of yet another simple mapping system employing the linear lumen image mapping error diffusion of this invention;

FIG. 3 is an illustration of the quantization or granularity problem associated with linear lumen mapping;

FIG. 7 is an illustration of a representative system implementing the invention.

BEST MODE FOR CARRYING OUT THE INVENTION

Figure 4:
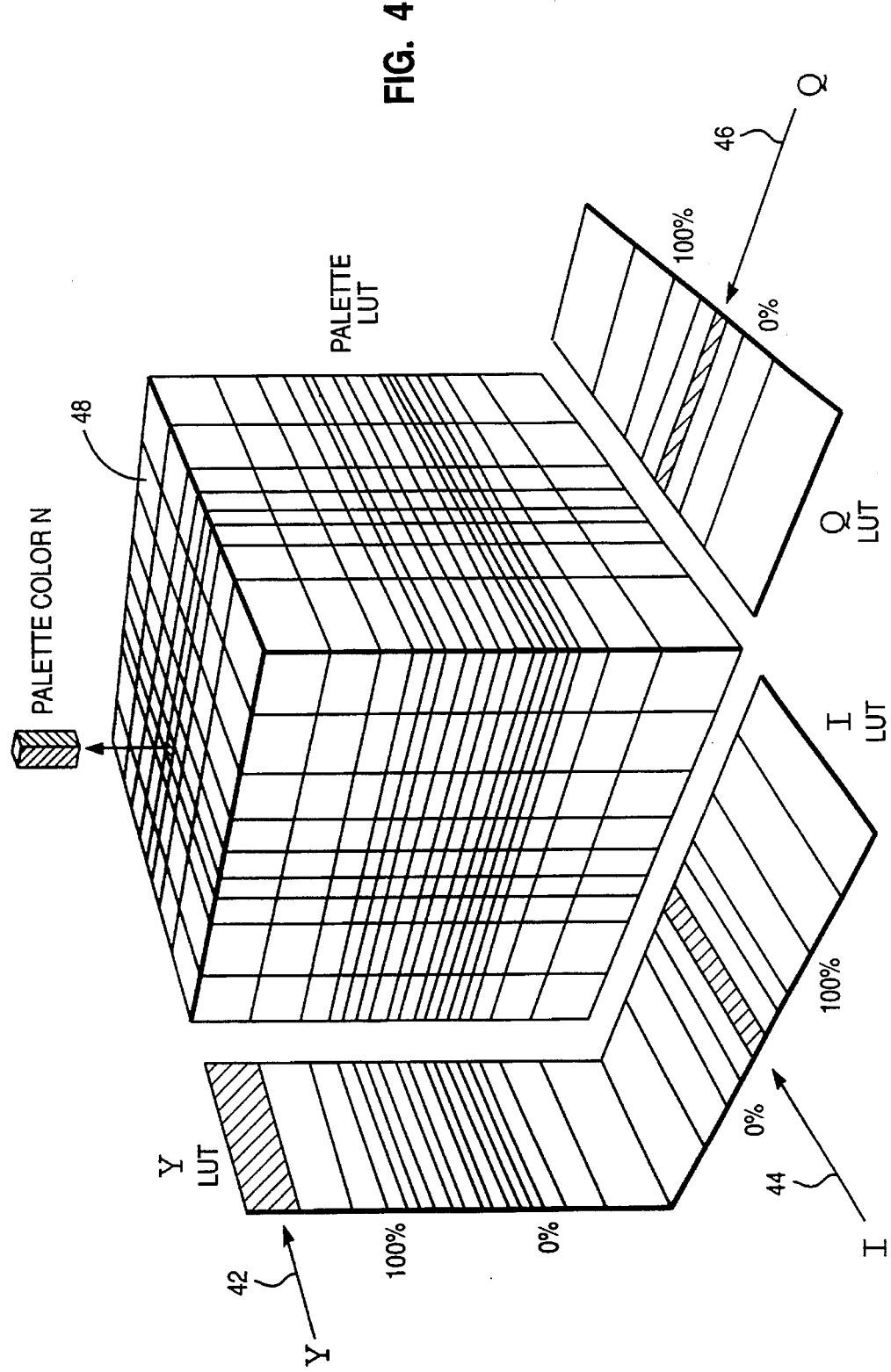
FIG. 4 is an illustration of a two-stage lookup table process of the present invention.

Referring to FIG. 4 in more detail, it will be recalled that it is a feature of the preferred embodiment to use a two-stage lookup process as illustrated in FIG. 4, wherein each color vector points to its own lookup table to select one of approximately 50 strategically placed states, the results of such lookups being combined to form a single pointer into a large three-dimensional lookup table holding the closest palette colors. In general, such a technique would be thought to present numerous problems. For example, in the shadows, I and Q have a very limited nonsaturation range, but the eye is very sensitive to small errors. Near highlights, these same small errors would go unnoticed, so in that part of the cube space representing Y, I, Q values extremely valuable memory space would be utilized for unnecessary resolution.

One approach to solving such a problem may be to provide a larger table. The theoretically minimum table size is the size of the palette which, in the present example, is just 256 entries. With linear diffusion applied in a straightforward manner, as described previously, it is readily apparent that table size becomes impractical. However, by employing the two-stage lookup procedure provided by the present invention the table size may be in the range of 64K to 512K bytes. Adding only ((cube root of two)−1)×100% more states in each of three color axes lookup tables results in volume of a three-dimensional lookup table cube, such as cube 48 of FIG. 4, doubling in size. Therefore, the required lookup table size is very sensitive to the efficient placement of color axes lookup table states, and accordingly optimum placement states are vital to rendering the two-stage lookup method of the invention practical.

Figure 5:
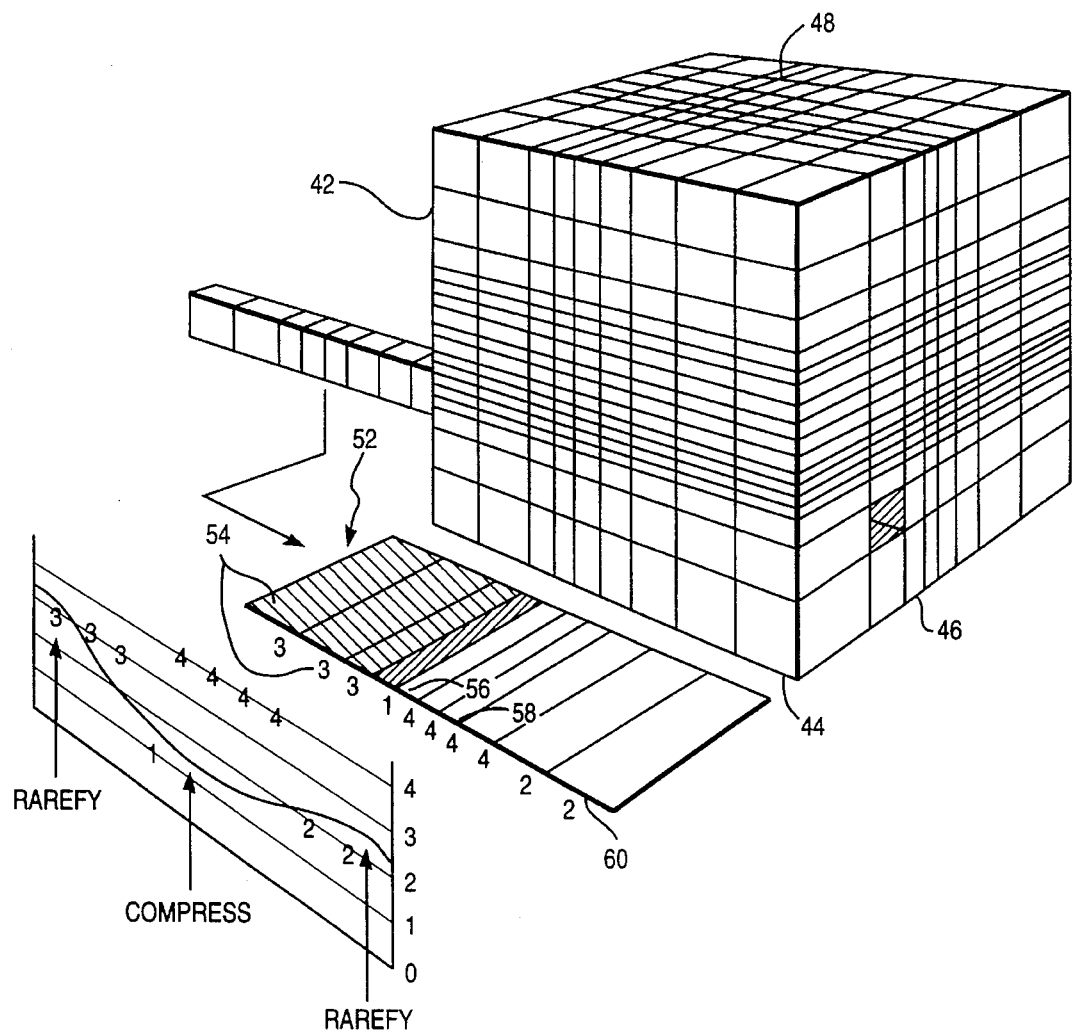
FIG. 5 is an illustration of the process for optimally positioning states in the first lookup tables in the manner of the invention.

Referring now to FIG. 5, this illustration depicts how the states in the first lookup tables might be optimally positioned in the manner of the invention. Essentially, with an initial estimate of placement, in accordance with the invention the step placements of each of the three color dimensions may be iteratively refined.

First, an example will be provided regarding refinement in the "I" axis. For each value of "Y" and "Q", the "I" row may be conceptually thought of as being slid out of the cube 48 and placed in front of the cube 48 at location 52. We may then consider what the closest palette colors were. As illustrated in FIG. 5, in the example there may be four closest palette colors 54–60 at the steps on this particular row 52. One of these colors 54 applied to four contiguous steps of "I" in an initial selection of step placement. For this row 52, one could rarefy steps in this range without much accuracy loss. However, one of the colors 56 applied to only a single step in our initial estimate of step placement. Accordingly, for this row 52, accuracy could be gained by concentrating steps in this range.

Still referring to FIG. 5, the foregoing procedure may be repeated for each "I" row and the number of contiguous steps of the same closest palette across all "I" rows may be averaged, using a reciprocal mean square average. In such a manner, it will be appreciated that the concern is more with avoiding under sampling a volume than over sampling it. In a refinement of the invention, states in the color volume of cube 48 would be weighted according to a typical "aim" occurrence during mapping. The resulting average is an indication of how to improve upon the initial step placement estimate. In an area where the average number of contiguous steps is twice as high, only half as many steps would be required as were otherwise present for equal accuracy. These steps may thus be allocated to an area where the average number of contiguous steps is only half as high. Equally important, however, the averages for the three color axes could be compared whereby steps may be reallocated among the three colors. The product of the total states allocated to each of the three colors cannot exceed the size of the large lookup table, but such three values do not need to be powers of two. When changing the placement of states on one axis, there is a secondary effect on the other axes, making the solution iterative. When the iterative process finishes, the averages are the same for all steps of all colors. The volume covered by the large lookup table extends well beyond saturation in all dimensions to be compatible with high noise diffusion methods. The volume can be considered infinite, but the step allocation algorithm rarefies states beyond saturation so that the memory size of the lookup table is finite.

Figure 6:
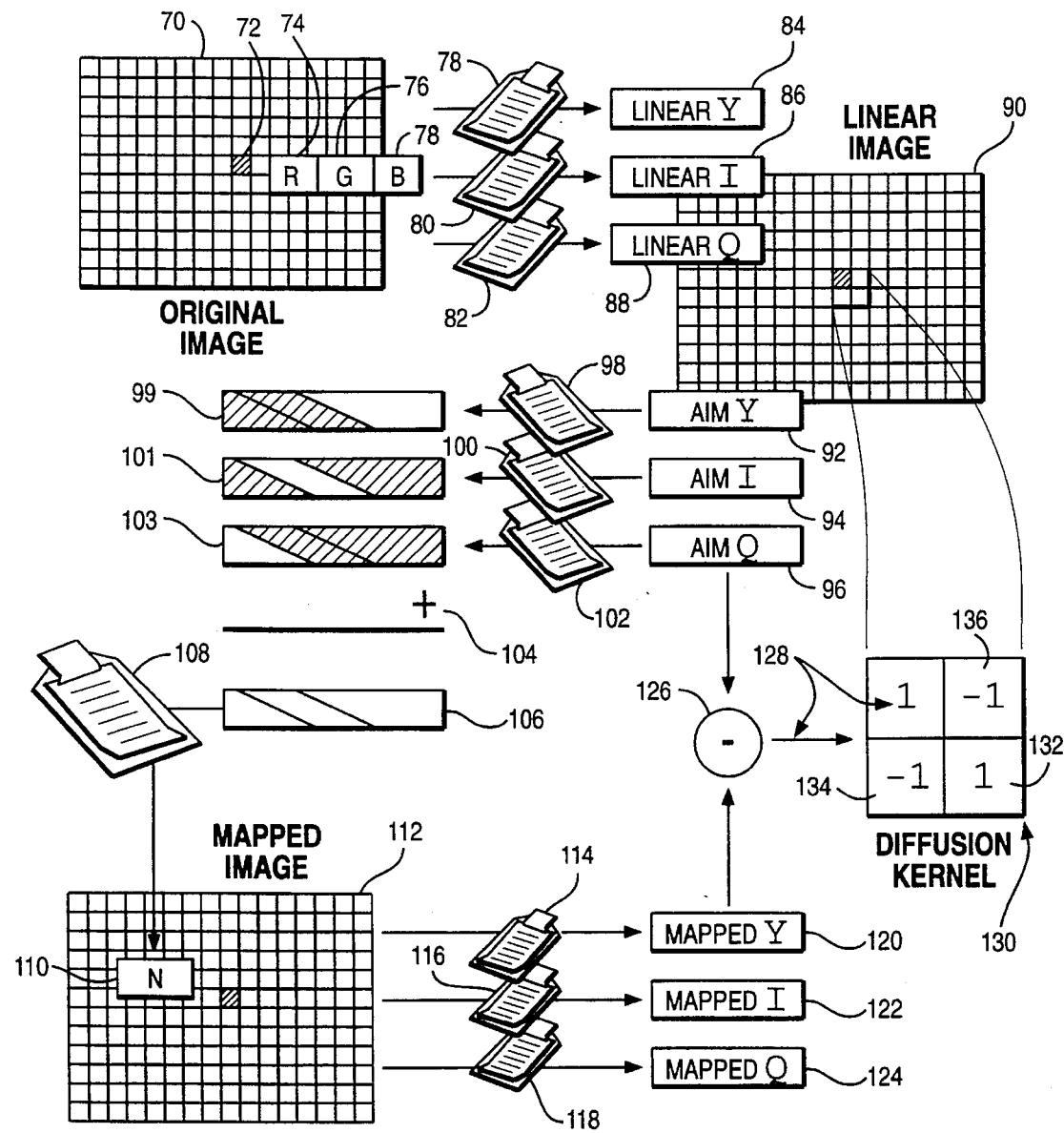
FIG. 6 is a schematic flow chart of the process of the invention.

Referring now to FIG. 6, a flow chart is depicted therein illustrating the sequence of operation of processing in the manner of the invention. It will be assumed that the original image has been digitized into a two-dimensional array 70 of picture elements or "pixels", such as pixel 72 each containing a corresponding red, green and blue value 74–78, respectively. The red, green, and blue values of each such pixel 72 are combined and used as a pointer into corresponding three lookup tables 78, 80 and 82 translating each pixel into a corresponding linear Y, I and Q value, respectively, 84, 86 and 88, these linearized pixels in combination thereby comprising a linear image 90.

A process is thereafter provided whereby each pixel in the linear image 90 is in turn processed in an order preferably left-to-right on each row, top row first to bottom row last, for example. The color value of each pixel in the linear image 90 is taken as an "aim" value, wherein the process will attempt to match as closely as possible with the predetermined palette of colors. These aim Y, I and Q values 92–96, respectively, are thence each used as a pointer into respective lookup tables 98, 100, 102 in order to translate these aim values 92–96 into a corresponding set of three intermediate numbers obtained from the tables 98–102. These three intermediate numbers are then added together as conceptually depicted at reference numeral 104 to yield a pointer 106 to a larger lookup table 108. This larger lookup table maps the pointer to a single "mapped" number 110 representing the closest color in the given preselected palette to the aim color. This mapped number 110 in the mapped image 112 is copied to the pixel of the final mapped image 112. During display, in the art of displaying mapped images, this mapped number 110 will reference the predetermined palette to yield a red, green and blue value for display on the image screen.

Three lookup tables 114–118 translate each of these mapped numbers 110 representing the closest palette color, back into linear space with mapped Y, I and Q values 120–124. The difference between these mapped values and the earlier aim values 92–96, as conceptually indicated by reference numeral 126, correspond to the error introduced for that pixel by selecting a color from the finite available palette. This error 128 is then corrected by diffusing an opposite error to adjoining pixels, such error correction being functionally represented at block 130. In one embodiment, this error 128 may be diffused utilizing a positive feedback diffusion kernel in the manner of copending U.S. patent application U.S. Ser. No. 08/153,798, entitled "Positive Feedback Error Diffusion Signal Processing", which is incorporated herein by reference. In practicing such a preferred positive feedback diffusion, the error is added to the closest diagonal pixel of the linear image in the direction of scan, 132, and subtracted from adjacent pixels 134, 136, in the direction of scan both horizontally and vertically. It will, of course, be readily appreciated that any prior art diffusion method could likewise be employed.

The purpose of such error diffusion is to cancel the effects of error over a region. These error canceling additions and subtractions alter the linear Y, I and Q values 84–88 of yet unmapped pixels from the original image to yield the aim I and Q values 92–96. The process will attempt to match these new values as these future pixels are mapped. The linear image 90 may be precalculated so that this addition and subtraction can be made ahead of the pixel thereafter being converted, or, to save memory space, the value to add and subtract may be kept in an array so that it may be added when the pixel is converted. In one embodiment, each pixel 72 is represented by a 16-bit RGB value 74–78. The tables 78–82 are preferably precalculated to include the linearity correction and color vector directions. One example of such precalculation may be seen in more detail in the article entitled "Separated Luminance and Chrominance Diffusion", *IBM Technical Disclosure Bulletin*, Vol. 35, No. 1A, June, 1992, pp. 60–61. It will be noted that the directions of the I and Q vectors are different from the standard definition known in the art, as evidenced by the following representative equations in one embodiment:

$$\text{linear } rgb = \frac{(rgb + .1)^2 - .01}{1.2}$$

$$y = +.299\, r + .587\, g + .114\, b$$
$$i = +.1732\, r - .1732\, g$$
$$q = -.0560\, r - .0560\, g + .1120\, b$$

The process of the invention does not need to know palette RGB values. Moreover, the linear Y, I, Q values 84–88, which are the aim values for each pel, may each even be translated through its own lookup table into a number which in the current example is 19 bits. The three resulting numbers 99, 101, 103, which are added, may be added in the manner of an article entitled "Pel Color Encoding with Room for Overflow", *IBM Technical Disclosure Bulletin*, Vol. 35, No. 1A, June, 1992, p. 52. as shown at adding step 104 resulting in the pointer 106 which will, accordingly, be a 19-bit pointer to the large lookup table 108. As previously described, from this large lookup table 108, the closest palette color is determined and stored in the mapped image 112, as well as being translated back into Y, I, Q values.

Although the preferred embodiment has used an error diffusion method of palette mapping, other mapping techniques are improved by first translating image colors to a domain linearly proportional to lumens emitted by a display, and further as an expedient are enhanced by using the two-stage lookup tables of this invention.

One such alternate mapping method is dither in which a fixed dither pattern is added to an image, then the closest palette color is found for each of the pixels to which the dither is added. In this method error is not calculated or diffused, rather the variation of the dither pattern is used to evoke a blending of nearest colors in the palette to average to a correct image color over an area.

Referring finally to FIG. 7, a typical system providing the environment for implementing the invention may be seen depicted therein. A computer 142, such as a PS/2$^{tm}$ (Trademark of IBM Corporation) system will execute the steps of the invention via a program loaded therein implementing the process previously described. The computer will first capture, by means of an appropriate source, such as a camera 146, scanner or via some other medium, an image based upon a source subject 144 which the computer 142 will thence digitize for subsequent processing. The mapped image created in accordance with the invention may be stored for display on a conventional monitor 148 for human observation or otherwise stored on media for eventual display. A conventional keyboard 143 and other I/O and user-interface devices will further be provided to the computer 142 for interacting to effect the invention. Inside the computer 142, a system bus 152 is provided which ties together the microprocessor 154, the previously described program 156, which instructs the microprocessor 154 how to execute the steps of the invention, and working memory 158, which the microprocessor 154 utilizes to store intermediate calculations such as the linear image previously described, the various lookup tables generally represented at reference numeral 160, the original, stored image 162 captured by the camera 146 and the mapped image 164 generated from the steps just described.

While this invention has been described with reference to the illustrated embodiment, this description is not intended to be construed in a limiting sense. Various modifications of the illustrated embodiment, as well as other embodiments of the invention will become apparent to those persons skilled in the art upon reference to this description. It is, therefore, contemplated that these appended claims will cover any such modifications or embodiments as fall within the true scope of the invention.

I claim:

1. A method for eliminating artifacts arising from display nonlinearities in an image of pixels forming image colors in a computerized digital image processing system having a predetermined finite multichromatic, full-tone palette of colors, comprising:

translating into the digital domain each of said pixels to a linear luminance aim value and two color aim values, said aim values being in a domain linearly proportional to lumens when said image is displayed;

selecting in nonlinear space three intermediate values from respective ones of three lookup tables formed from said translated pixels wherein the number of bits for each of said translated pixels remains the same when formed in said lookup tables, each of said intermediate values corresponding to a respective different one of said luminance aim value and two-color aim values;

wherein each of said lookup tables corresponds to respective three color vectors wherein said three color vectors are each comprised of a luminance vector corresponding to said luminance aim value and two color vectors corresponding to said two color aim values; and forming, by summing said three intermediate values, a pointer from said three intermediate values;

defining a lookup table corresponding to a plurality of said pointers to colors of said predetermined palette;

selecting one of said colors from said predetermined palette in linear lumen space in functional relation to said pointer as a closest color in said predetermined palette to one of said image colors;

mapping said pointer to a color value in said lookup table corresponding to said closest palette color; translating from said nonlinear space said mapped value back to linear space with corresponding mapped luminance and two color values;

repeating the preceding steps for each of said pixels to create a plurality of processed pixels; and combining said processed pixels thereby effecting said eliminating of said artifacts and said display of said image.

2. The method of claim 1 further including the step of detecting differences between said aim values and said corresponding mapped luminance and two color values, wherein said differences comprise error arising from said finite palette.

3. The method of claim 2 further including repeating the preceding steps with respect to each of said pixels to determine an error associated with each of said pixels; and correcting said error by error diffusion of error of a given one of said pixels with error associated with pixels proximal said given one of said pixels.

4. The method of claim 2 wherein the step of detecting differences includes detecting differences for one of said pixels;

altering said linear luminance and two color aim values associated with an unmapped pixel; and thereafter converting said unmapped pixel to aim values by translating with respect to said unmapped pixel linear luminance and two color aim values associated with said unmapped pixel.

* * * * *